United States Patent
Rocquet

(10) Patent No.: US 6,453,796 B1
(45) Date of Patent: Sep. 24, 2002

(54) ACTUATING CYLINDERS

(75) Inventor: Stephane Rocquet, Sandillon (FR)

(73) Assignee: Automotive Products France, SA, Herblay-Cergy-Pontoise (FR)

( * ) Notice: Subject to any disclaimer, the term of this patent is extended or adjusted under 35 U.S.C. 154(b) by 0 days.

(21) Appl. No.: 09/556,093

(22) Filed: Apr. 21, 2000

(51) Int. Cl.$^7$ ............................................... F01B 29/00
(52) U.S. Cl. ........................ 92/161; 403/252; 192/115
(58) Field of Search ........................ 92/161; 192/115; 403/252; 248/503

(56) References Cited

U.S. PATENT DOCUMENTS

| | | | |
|---|---|---|---|
| 2,093,038 A | * 9/1937 | Douglas | 248/27.3 |
| 2,884,283 A | * 4/1959 | Korol et al. | 348/27.3 |
| 4,516,748 A | * 5/1985 | Nix et al. | 192/115 |
| 4,581,979 A | 4/1986 | Compton et al. | 92/23 |
| 4,599,860 A | 7/1986 | Parsons | 60/585 |
| 4,905,576 A | * 3/1990 | Reynolds | 92/161 |
| 6,000,516 A | * 12/1999 | Teichert et al. | 92/161 |

* cited by examiner

Primary Examiner—F. Daniel Lopez
(74) Attorney, Agent, or Firm—Paul E Milliken; Ray L Weber

(57) ABSTRACT

A fluid pressure operated actuating cylinder (11) for mounting in an aperture (13) in a wall (14) of a vehicle, the cylinder comprising a body (12) having first abutment tabs (17)(18) with a first locating surface (17a)(21a) facing in a first direction and second deflectable abutment lugs (17) and has a second locating surface (19a) facing in a second direction generally opposite to the first direction, the first and second locating surfaces (17a)(21a) being arranged to contact respective first and second oppositely directed surfaces (14a)(14b) of the wall 14 after insertion of the cylinder (11) through the aperture 13 with resulting deflection of the second abutment lugs (19) to locate the cylinder in the aperture. The actuating cylinder is mounted on the vehicle by simply inserting the cylinder (11) through the aperture (13) which deflects the second abutment lugs (19) as the cylinder passes through the aperture and allows the second abutment lugs to snap out into contact with the second wall surface (14b) after insertion in the aperture thus fully locating the cylinder in the aperture.

12 Claims, 3 Drawing Sheets

ACTUATING CYLINDERS

This invention relates to actuating cylinders and in particular to fluid pressure operated actuating cylinders used to operate such functions as vehicle clutches.

There is a long standing requirement to provide such an actuating cylinder which is both cheap to produce and easy to quickly mount in its operational position on a vehicle.

It is an object of the present invention to provide an actuating cylinder which meets the above requirements.

Thus according to the present invention there is provided a fluid pressure operated actuating cylinder for mounting in an aperture in a wall of a vehicle, the cylinder comprising a body having first abutment means with a first locating surface facing in a first direction and a second deflectable abutment means which acts as a first snap connector and is axially spaced from the first abutment means and has a second locating surface facing in a second direction generally opposite to said first direction, said first and second locating surfaces being arranged to contact respective first and second oppositely directed to surfaces of said wall after insertion of said cylinder through said aperture with consequential deflection of said second abutment means to locate said cylinder in said aperture.

Such an actuating cylinder can easily be mounted on the vehicle by simply inserting the cylinder through the aperture which deflects the second abutment means as the cylinder passes through the aperture and allows the second abutment means to snap out into contact with the second wall surface after insertion thus fully locating the cylinder in the aperture.

The first abutment means is preferably in the form of a number of radially projecting tabs circumferentially spaced locations around the body.

The second abutment means preferably comprises a number of radially extending deflectable lugs at circumferentially spaced locations around the body.

The body is also preferably provided with a number of longitudinally extending ribs at circumferentially spaced locations around the body for contact with the sides of the aperture.

The body is preferably provided with one or more locating formations for engagement with co-operating formations on the wall to prevent rotation of the cylinder within the aperture.

The first and second abutment means are preferably braced against the contacting wall surfaces by deflection of one or both of the abutment means to hold the cylinder against the vibration relative to the wall. Flexibility of one or both of the abutment means may be used to filter vibrations to prevent them reaching the pedal.

The first and second abutment means and any ribs or formations employed may be formed integrally with the cylinder body.

Alternatively, and preferably, the first and second abutment means and any ribs or formations employed may be formed on a separate sleeve-like mounting support which encircles the actuator body proper and is secured thereto, for example, by a second snap connector means.

Such a separate sleeve-like component enables the cylinder body proper to be of a cheaper construction and enables the same mounting support to be used for a number of different cylinder bodies. Alternatively, the same cylinder body can be used for different vehicle applications simply by using a different mounting support.

The invention is applicable both to master cylinders and slave cylinders and the cylinder body proper and/or the mounting support member can conveniently be moulded from plastics material, although this is not essential.

One embodiment of the present invention as applied to a slave cylinder for a vehicle clutch will now be described, by way of example only, with reference to the accompanying drawings in which.

Figure 1:
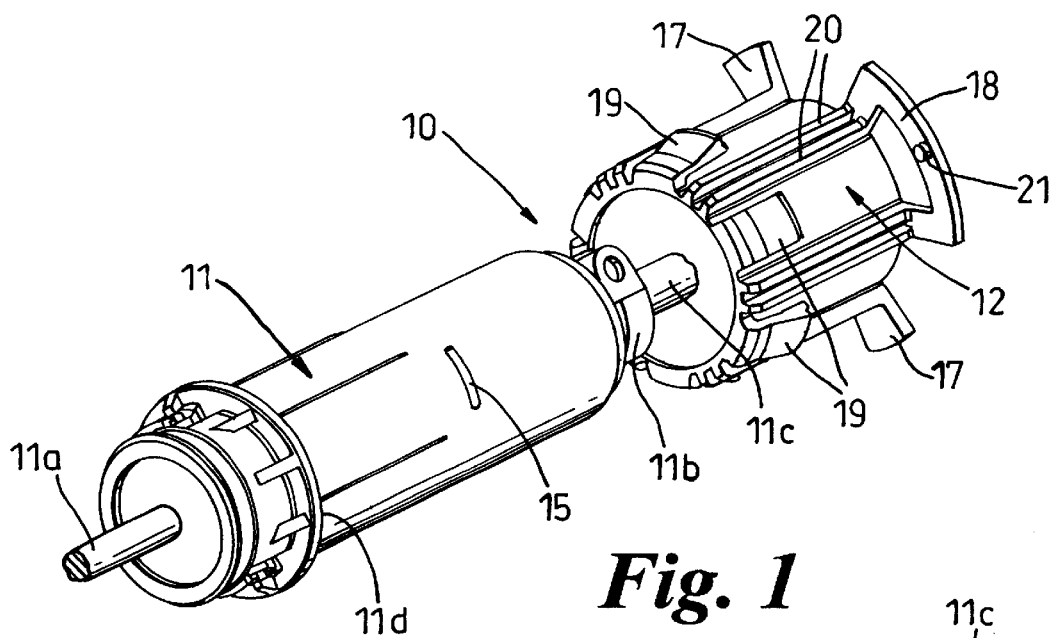
FIG. 1 shows a perspective view of the component parts of a clutch actuating cylinder in accordance with the present invention.
Figure 2:
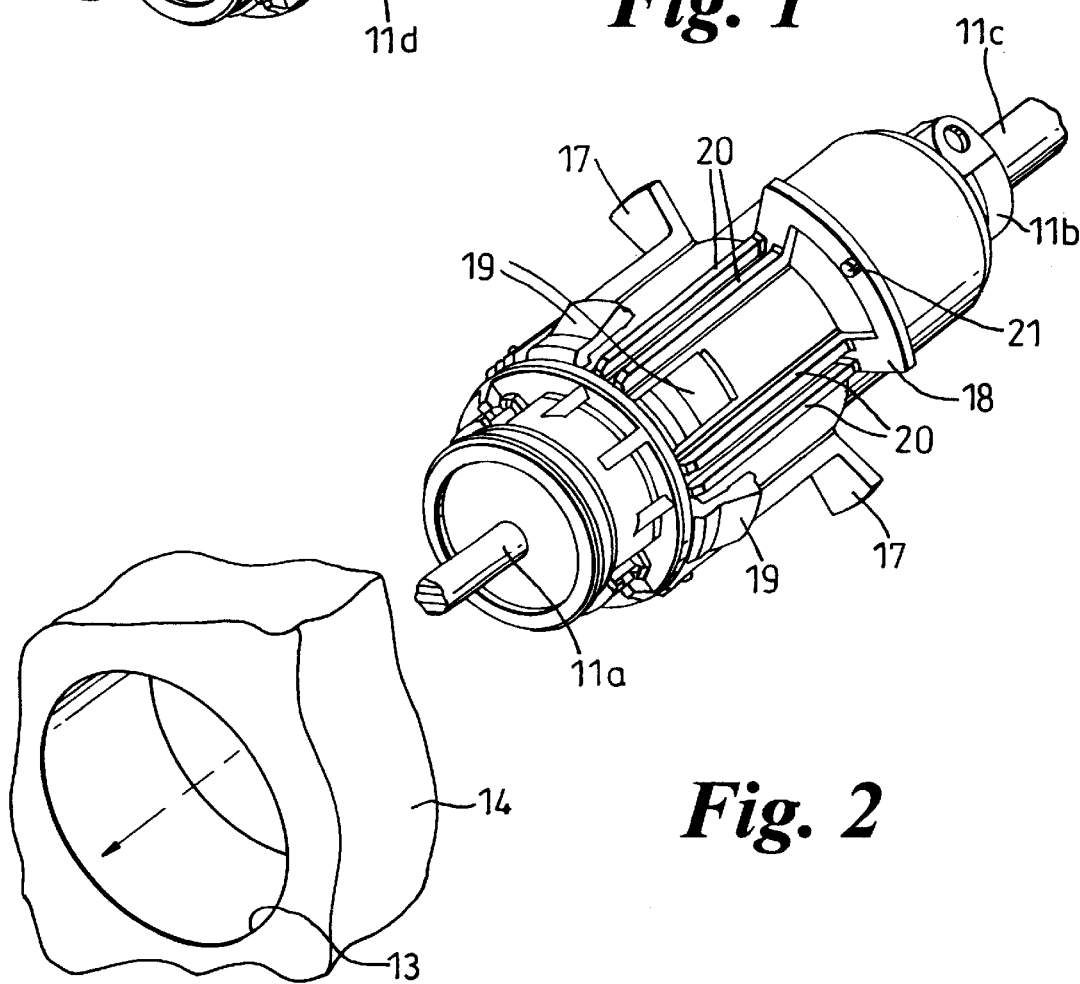
FIG. 2 shows the assembled actuating cylinder of FIG. 1 about to be fitted in its operational position in a vehicle.
Figure 4:
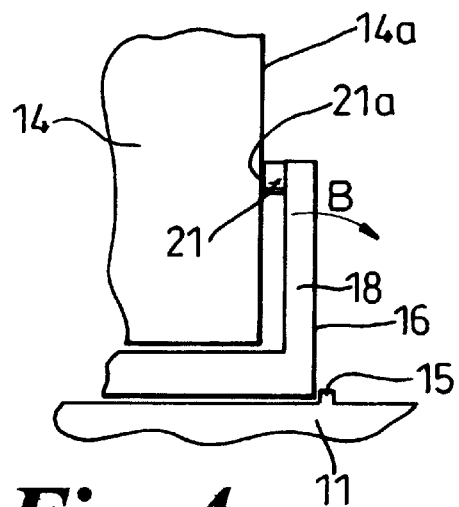
FIGS. 4 and 5 show on a larger scale certain features of part of the actuating cylinder of FIG. 1.

Referring to FIG. 1, a slave clutch actuating cylinder 10 in accordance with the present invention comprises a slave cylinder proper 11 which is mounted within a sleeve-like mounting support 12 designed to support the actuating cylinder within an aperture 13 in a wall 14 of a vehicle clutch housing or gear box casing. The slave cylinder 11 has the normal piston operated clutch actuating rod 11a and is also connected via a connector 11b with a conduit 11c which is connected with a pedal-operated master cylinder (not shown). The slave cylinder is held within the mounting support 12 by projections 15 on the outside of the slave cylinder 11 which snap behind a rear face 16 of the mounting support 12 as shown in FIG. 4 so that the support 12 is held between projection 15 and a flange 11d on the slave cylinder.

It will be appreciated that the slave cylinder 11 and mounting support 12 could be formed as an integral unit but for convenience and maximum adaptability it is preferred that these are formed as separate components.

Figure 3:
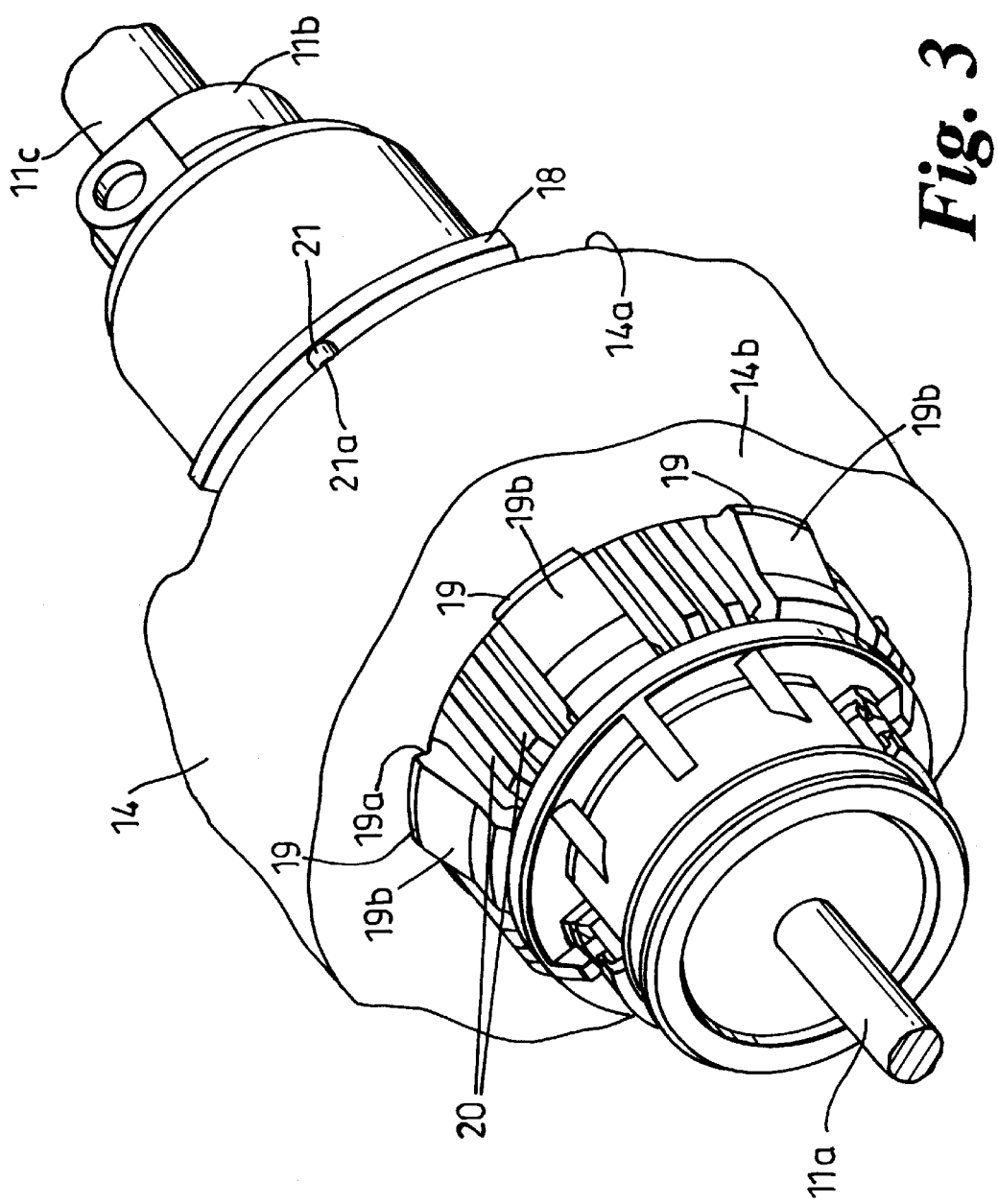
FIG. 3 shows the clutch actuating cylinder of FIG. 1 in its operational position.
Figure 5:
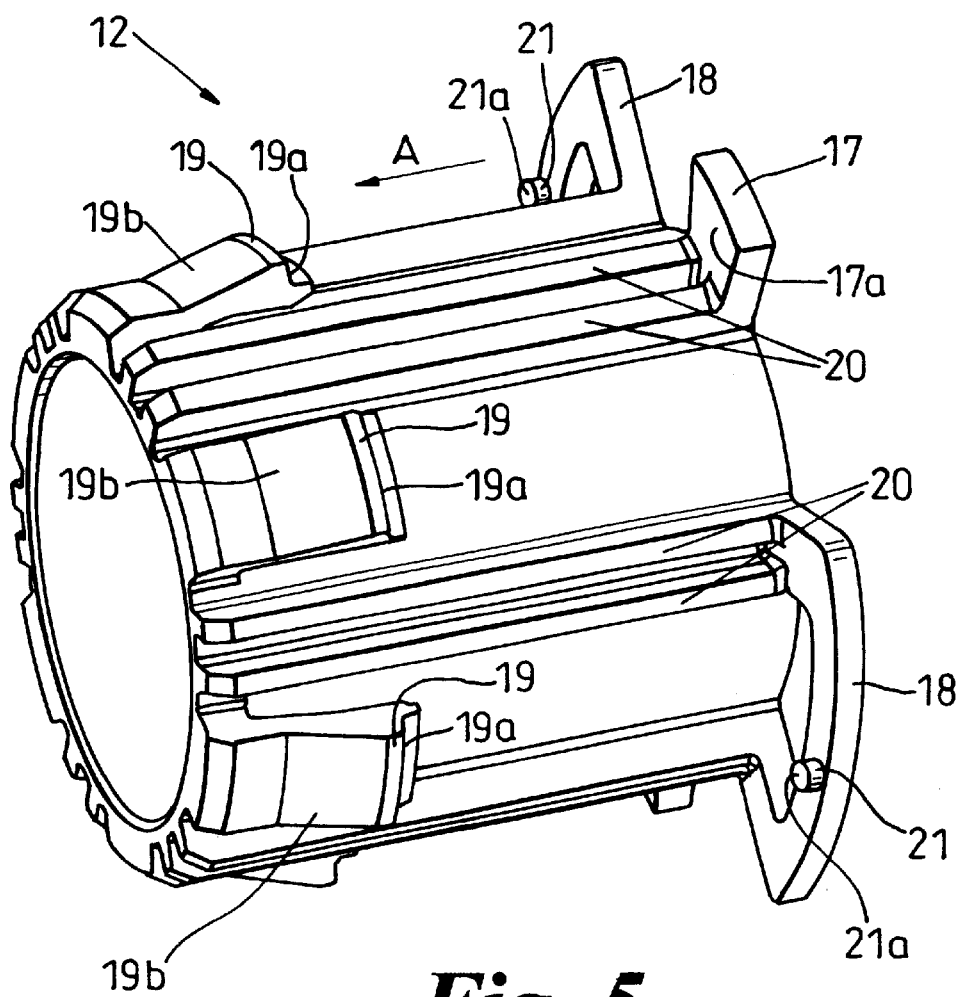

The mounting support 12, best seen in FIG. 5, includes a first abutment means in the form of a first pair of radially projecting tabs 17 and a second pair of larger radially projecting tabs 18 with projections 21 thereon. Each pair of tabs has a first locating surface 17a, 21a which faces in a first direction A and a second abutment means in the form of six circumferentially spaced deflectable lugs 19 each of which has a second locating surface 19a which faces in a second directly generally opposed to said first direction A. As can be seen from FIGS. 3 and 4, when the actuating cylinder is installed in the wall 14 the first and second locating surfaces 21a and 19a contact first and second oppositely directed surfaces 14a and 14b of the wall 14 to locate the cylinder in the aperture 13.

As will be appreciated the deflectable lugs 19 are pressed radially inwardly by contact between the aperture 13 and ramp portions 19b of mass 19 as the actuating cylinder is inserted through the aperture. The lugs 19 subsequently snap outwardly on emerging through the aperture 13 to act as a snap connector which locates the actuating cylinder within the aperture 13. The clutch disengagement force applied to the clutch (not shown) is reacted by surfaces 19a of lugs 19 which must be designed accordingly.

The mounting support 12 also includes longitudinally extending ribs 20 at circumferentially spaced locations around the support. These ribs contact the inside surface of the aperture 13.

To further locate the actuating cylinder within the aperture and help prevent movement of the cylinder within the aperture one or both of the tabs 18 or lugs 19 may be arranged to be braced against the surface 14a, 14b of the wall 14 by placing the tab or lug in a permanent state of deflection. This is achieved in the arrangement shown by projections 21 on tabs 18 which have surfaces 21a which contact wall surface 14a and deflect the tabs 18 as shown by arrow B in FIG. 4. Such a braced arrangement is a further expedient to ensure that the actuating cylinder does not move relative to the wall 14 thus eliminating or at least reducing the possibility of vibration of the actuating cylinder during operation of the clutch. Also flexibility of tabs 18 or lugs 19 may be used to filter vibrations of the actuating cylinder and prevent these reaching the clutch operating pedal.

The tabs 18 may also be provided with locating formations (similar to projections 21) which extend into complementary apertures in the wall 14 thus preventing rotation of the actuating cylinder relative to the wall.

As will be appreciated the actuating cylinder is of a particularly compact construction which can be easily installed in the aperture in the clutch housing/transmission housing by simply inserting the actuating cylinder through the aperture 13 and allowing the deflectable lugs 19 to snap into contact with the inside surface 14b of the wall 14.

The actuating cylinder is therefore cheap to produce, easy to install and occupies very little space in the vehicle.

Both the slave cylinder body 11 and the mounting support 12 can conveniently be moulded from plastics material or if desired one or both these component may be made from metal.

As indicated above the slave cylinder 11 and mounting support 12 are preferably separate components but the tabs 17, 18, lugs 19 and ribs 20 of the mounting support may be incorporated into the slave cylinder 11 which could be a plastics component or a metal component.

As will be appreciated, if the slave cylinder 11 and mounting support 12 are separate then the same slave cylinder 11 could be mounted in a number of vehicles by using different mounting supports 12 or alternatively the same mounting support 12 could be used to mount different slave cylinders 11 in different vehicles. Also, the invention is applicable not only to slave cylinders, as described above, but also to master cylinders enabling the master cylinder to be easily and quickly mounted in an aperture in a pedal box or fire wall/bulkhead of the vehicle at the pedal end of a clutch operating system.

The actuating cylinder of the present invention may also form part of a so-called pre-filled clutch actuating system as shown, for example, in U.S. Pat. No. 4581979.

What is claimed is:

1. A fluid pressure operated actuating cylinder for mounting in an aperture in a wall of a vehicle comprising a body having a plurality of radially extending circumferentially spaced first abutment means each with a first locating surface facing in a first direction and a plurality of circumferentially spaced radially extending deflectable second abutment means axially space from the first abutment means, each second abutment meets having a second locating surface facing in a second direction generally opposed to said first direction, said first and second locating surfaces being arranged to contact respective first and second oppositely directed surfaces of said wall after insertion of said cylinder through said aperture and radial deflection of said second abutment means to locate said cylinder in said aperture.

2. An actuating cylinder according to claim 1 in the form of a clutch slave cylinder for location in an aperture in a clutch housing or gearbox casing.

3. An actuating cylinder according to claim 1 which forms part of a pre-filled clutch hydraulic system.

4. An actuating cylinder according to claim 1 in which the body is provided with a number of longitudinally extending ribs at circumferentially spaced locations around the body for contact with the sides of the aperture.

5. An actuating cylinder according to claim 1 in which the body has one or more locating formations for engagement with co-operating formations on the wall to prevent rotation of the cylinder within the aperture.

6. An actuating cylinder according to claim 1 in which the first and second abutment means are braced against the contacting wall surfaces by deflection of one or both of the abutment means to hold the cylinder against vibration relative to the wall.

7. An actuating cylinder according to claim 1 in which the first and second abutment means are formed integrally with the cylinder body.

8. An actuating cylinder according to claim 7 in which the actuator body is moulded from plastics material.

9. An actuating cylinder according to claim 1 in which first and second abutment means are formed on a separate sleeve-like mounting support which encircles the actuator body proper and is secured thereto.

10. An actuating cylinder according to claim 9 in which the mounting support is moulded from plastics material.

11. An actuating cylinder according to claim 9 in which the mounting support is connected with the body via second snap connector means.

12. An actuating cylinder according to claim 1 in the form of a clutch operating master cylinder for location in an aperture in a vehicle body bulkhead.

\* \* \* \* \*